No. 882,662. PATENTED MAR. 24, 1908.
H. ANDREWS.
HOOF CUTTING KNIFE.
APPLICATION FILED JULY 11, 1907.
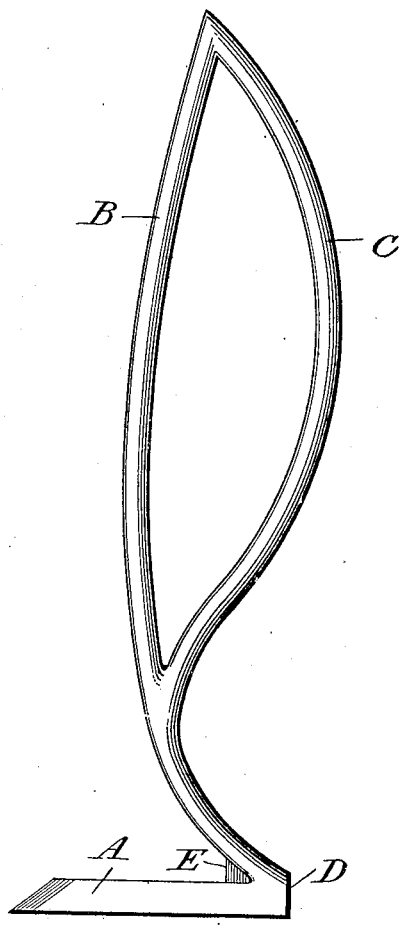
Witnesses:
J. W. Smith
Gussie E. Eaton
Inventor,
Harry Andrews.

UNITED STATES PATENT OFFICE.

HARRY ANDREWS, OF STRATTON, NEBRASKA.

HOOF-CUTTING KNIFE.

No. 882,662.        Specification of Letters Patent.        Patented March 24, 1908.

Application filed July 11, 1907. Serial No. 383,355.

*To all whom it may concern:*

Be it known that I, HARRY ANDREWS, a citizen of the United States, residing at Stratton, in the county of Hitchcock and State of Nebraska, have invented a new and useful Hoof-Cutting Knife, of which the following is a specification.

My invention relates to an improvement in hoof cutting knives and is made of tool steel with the blade at right angles with the handle, the handle being oval, the upper part being for the hand hold and the lower part to rest upon the ground and curving forward toward the blade so as to enable it to rotate when the blow is struck, the object being to enable the operator to trim horses' hoofs without removing the hoof from the ground in taking off the outside shell, to reduce the jar and strain upon the hoof and joint as occurs in the usual way; to avoid splitting the shell; to reduce the jar so as to be less irritating to the horse, also to remove shoes and to level up the bottom of the hoof, and generally to enable the operator to trim the hoof and remove old shoes with more speed and accuracy and less labor to the operator and less annoyance to the horse. The shoe being removed by cutting the clench of the nails with the knife and then inserting the knife blade between the shoe and the hoof and the shoe pried off.

The mechanism of said knife is illustrated in the drawing, accompanying my application, in which "A" is the blade, "B" is to rest on the ground while "A" is on the hoof. "C" is the handle and is used as a brace on "B". The space under the handle "C" is for placing the toe of the shoe or foot, to hold the knife firm on the ground while the blade is on the hoof while cutting the shell of the hoof with the knife, by striking above the blade at "D".

"E" is a brace for the blade.

Having now fully described my invention, what I claim as new and desire to secure by Letters Patent, is:—

1. A hoof-cutting knife formed with an opening for the insertion of the hand or foot of the operator, an arched shank extending from the hand-hold, and a blade formed on the shank and at an angle to the hand-hold.

2. A hoof-cutting knife, consisting of a handle having an opening for the hand or foot of the operator, an arched shank extending from the handle, a blade carried by the shank, and a shoulder between the shank and blade, said shoulder having a striking surface.

HARRY ANDREWS.

Witnesses:
J. W. SMITH,
GUSSIE E. EATON